(12) United States Patent
Abedini et al.

(10) Patent No.: US 12,520,119 B2
(45) Date of Patent: Jan. 6, 2026

(54) CONFIGURING USER EQUIPMENT PAGING IN ACCORDANCE WITH USER EQUIPMENT MOBILITY

(71) Applicant: QUALCOMM Incorporated, San Diego, CA (US)

(72) Inventors: Navid Abedini, Basking Ridge, NJ (US); Naeem Akl, Bridgewater, NJ (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/472,109

(22) Filed: Sep. 21, 2023

(65) Prior Publication Data
US 2025/0106611 A1    Mar. 27, 2025

(51) Int. Cl.
*H04W 8/12* (2009.01)
*H04W 60/04* (2009.01)
*H04W 68/02* (2009.01)

(52) U.S. Cl.
CPC .............. *H04W 8/12* (2013.01); *H04W 60/04* (2013.01); *H04W 68/02* (2013.01)

(58) Field of Classification Search
CPC ........ H04W 8/12; H04W 60/04; H04W 68/02
See application file for complete search history.

(56) References Cited

U.S. PATENT DOCUMENTS

| | | | |
|---|---|---|---|
| 2014/0073287 A1* | 3/2014 | Zhang | H04W 74/00 455/418 |
| 2018/0184246 A1* | 6/2018 | Ryu | H04W 68/06 |
| 2021/0168695 A1* | 6/2021 | Ryu | H04W 8/14 |

* cited by examiner

*Primary Examiner* — Khoa Huynh
(74) *Attorney, Agent, or Firm* — Kevin M. Donnelly; Seyfarth Shaw LLP

(57) ABSTRACT

A method for wireless communication by a user equipment (UE) includes receiving, from a network node, a first message indicating one or more parameters associated with a limited mobility zone within a coverage area of one or more cells. The method also includes transmitting, to the network node, a second message indicating the UE is within the limited mobility zone in accordance with determining the UE is within the limited mobility zone in accordance with the one or more parameters. The method further includes receiving, from the network node, a third message including first paging information in accordance with a first paging configuration associated with the limited mobility zone.

30 Claims, 10 Drawing Sheets

900

RECEIVE, FROM A NETWORK NODE, A FIRST MESSAGE INDICATING ONE OR MORE PARAMETERS ASSOCIATED WITH A LIMITED MOBILITY ZONE WITHIN A COVERAGE AREA OF ONE OR MORE CELLS — 902

TRANSMIT, TO THE NETWORK NODE, A SECOND MESSAGE INDICATING THE UE IS WITHIN THE LIMITED MOBILITY ZONE IN ACCORDANCE WITH DETERMINING THE UE IS WITHIN THE LIMITED MOBILITY ZONE IN ACCORDANCE WITH THE ONE OR MORE PARAMETERS — 904

RECEIVE, FROM THE NETWORK NODE, A THIRD MESSAGE INCLUDING FIRST PAGING INFORMATION IN ACCORDANCE WITH A FIRST PAGING CONFIGURATION ASSOCIATED WITH THE LIMITED MOBILITY ZONE — 906

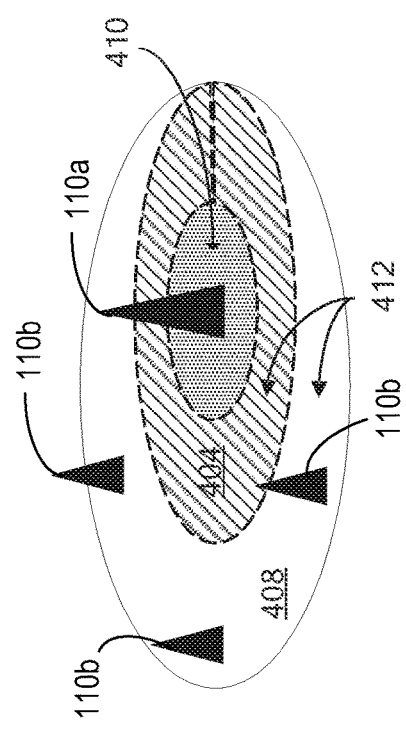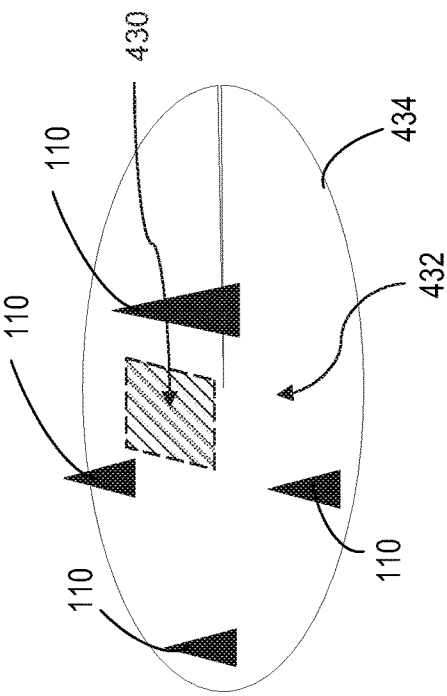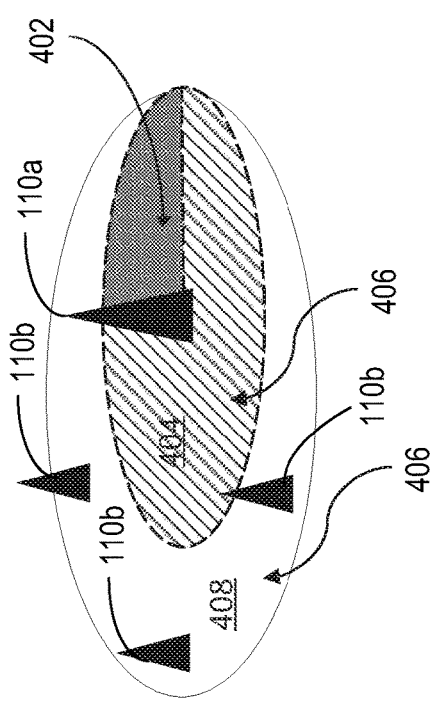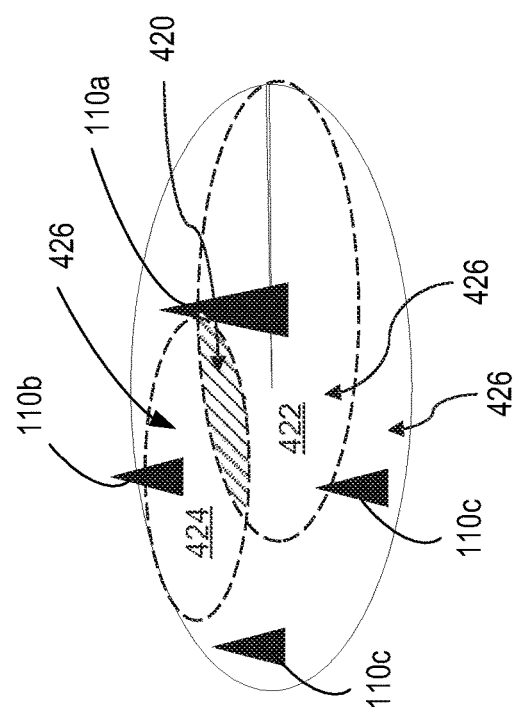

CONFIGURING USER EQUIPMENT PAGING IN ACCORDANCE WITH USER EQUIPMENT MOBILITY

FIELD OF THE DISCLOSURE

The present disclosure relates generally to wireless communication, and more specifically to configuring user equipment (UE) paging in accordance with UE mobility.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In some cases, a network node may transmit paging signals to one or more user equipment (UEs) within a coverage area in accordance with a restricted paging configuration. In such cases, the network node may broadcast the paging signals over a relatively broad coverage area, such as a coverage area including one or more cells or a whole tracking area associated with a tracking area code (TAC). Each UE within the coverage area may receive the paging signals. In some other cases, the network node may transmit paging signals to one or more UEs within the coverage area in accordance with an enhanced paging configuration. In such cases, the network node may use beam-level information to target a subset of UEs, from a set of UEs, within the coverage area. Each beam corresponds to a directional signal transmitted by the network, thus localizing the transmission of the paging signals.

SUMMARY

In one aspect of the present disclosure, a method for wireless communication at a user equipment (UE) includes receiving, from a network node, a first message indicating one or more parameters associated with a limited mobility zone within a coverage area of one or more cells. The method also includes transmitting, to the network node, a second message indicating the UE is within the limited mobility zone in accordance with determining the UE is within the limited mobility zone in accordance with the one or more parameters. The method further includes receiving, from the network node, a third message including first paging information in accordance with a first paging configuration associated with the limited mobility zone.

Another aspect of the present disclosure is directed to an apparatus including means for receiving, from a network node, a first message indicating one or more parameters associated with a limited mobility zone within a coverage area of one or more cells. The apparatus also includes means for transmitting, to the network node, a second message indicating the UE is within the limited mobility zone in accordance with determining the UE is within the limited mobility zone in accordance with the one or more parameters. The apparatus further includes means for receiving, from the network node, a third message including first paging information in accordance with a first paging configuration associated with the limited mobility zone.

In another aspect of the present disclosure, a non-transitory computer-readable medium with non-transitory program code recorded thereon is disclosed. The program code is executed by one or more processors and includes program code to receive, from a network node, a first message indicating one or more parameters associated with a limited mobility zone within a coverage area of one or more cells. The program code also includes program code to transmit, to the network node, a second message indicating the UE is within the limited mobility zone in accordance with determining the UE is within the limited mobility zone in accordance with the one or more parameters. The program code further includes program code to receive, from the network node, a third message including first paging information in accordance with a first paging configuration associated with the limited mobility zone.

Another aspect of the present disclosure is directed to a UE including one or more processors, and one or more memories coupled with the one or more processors and storing processor-executable code that, when executed by the one or more processors, is configured to receive, from a network node, a first message indicating one or more parameters associated with a limited mobility zone within a coverage area of one or more cells. Execution of the processor-executable code also cause the UE to transmit, to the network node, a second message indicating the UE is within the limited mobility zone in accordance with determining the UE is within the limited mobility zone in accordance with the one or more parameters. Execution of the processor-executable code further cause the UE to receive, from the network node, a third message including first paging information in accordance with a first paging configuration associated with the limited mobility zone.

In one aspect of the present disclosure, a method for wireless communication at a UE includes receiving, from a network node, a first message indicating a limited mobility zone and a high mobility zone within a coverage area of one or more cells. The method further includes receiving, from the network node, a second message registering the UE with the limited mobility zone in accordance with a mobility of the UE being less than a mobility threshold. The method also includes receiving, from the network node, a third message including first paging information in accordance with a first paging configuration associated with the limited mobility zone.

Another aspect of the present disclosure is directed to an apparatus including means for receiving, from a network node, a first message indicating a limited mobility zone and a high mobility zone within a coverage area of one or more cells. The apparatus further includes means for receiving, from the network node, a second message registering the UE with the limited mobility zone in accordance with a mobility of the UE being less than a mobility threshold. The apparatus also includes means for receiving, from the network node, a third message including first paging information in accordance with a first paging configuration associated with the limited mobility zone.

In another aspect of the present disclosure, a non-transitory computer-readable medium with non-transitory program code recorded thereon is disclosed. The program code is executed by one or more processors and includes program code to receive, from a network node, a first message indicating a limited mobility zone and a high mobility zone within a coverage area of one or more cells. The program code further includes program code to receive, from the network node, a second message registering the UE with the limited mobility zone in accordance with a mobility of the UE being less than a mobility threshold. The program code also includes program code to receive, from the network node, a third message including first paging information in accordance with a first paging configuration associated with the limited mobility zone.

Another aspect of the present disclosure is directed to a UE including one or more processors, and one or more memories coupled with the one or more processors and storing processor-executable code that, when executed by the one or more processors, is configured to receive, from a network node, a first message indicating a limited mobility zone and a high mobility zone within a coverage area of one or more cells. Execution of the processor-executable code also cause the UE to receive, from the network node, a second message registering the UE with the limited mobility zone in accordance with a mobility of the UE being less than a mobility threshold. Execution of the processor-executable code further cause the UE to receive, from the network node, a third message including first paging information in accordance with a first paging configuration associated with the limited mobility zone.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIGS. 4A, 4B, 4C, and 4D are diagrams illustrating examples of respective mobility zones, in accordance with various aspects of the present disclosure.

DETAILED DESCRIPTION

Figure 1:
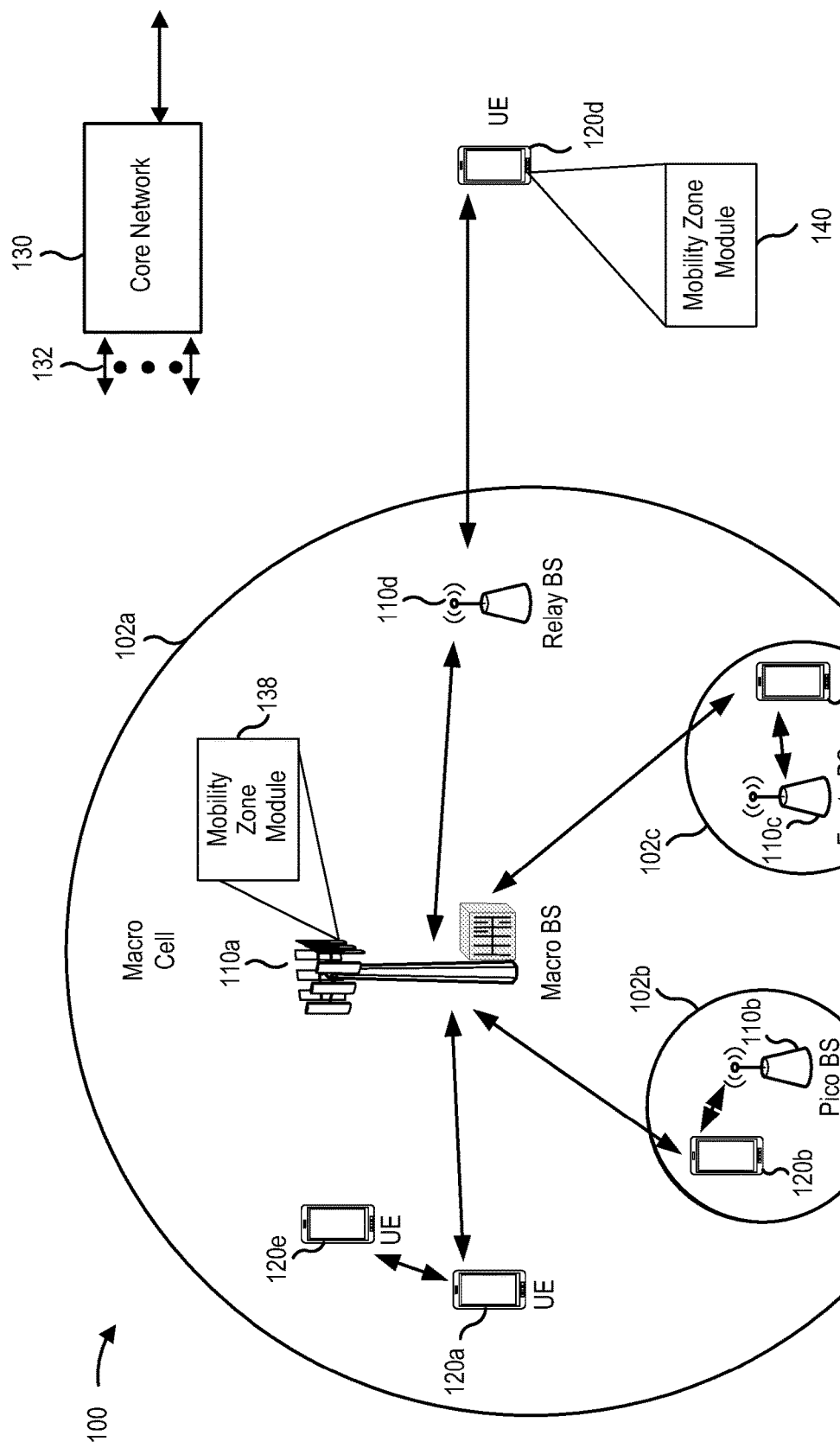
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As discussed, in some cases, a network node may transmit paging signals to one or more user equipment (UEs) within a coverage area in accordance with an enhanced paging configuration. In such cases, the network node may use beam-level information to target a subset of UEs, from a set of UEs, within the coverage area. The subset of UEs may include one or more UEs. Each beam corresponds to a directional signal transmitted by the network, thus localizing the transmission of the paging signals.

In some examples, the network node may initiate a paging procedure to locate one or more specific UEs in accordance with the enhanced paging configuration. This paging procedure may be an example of radio access network (RAN) initiated paging. In such cases, the network node targets the subset of UEs, from the set of UEs, for one or more paging signals from the network node. In some such examples, the network node may use a secondary synchronization signal (SSS) list to target the subset of UEs. This approach reduces unnecessary paging attempts to UEs that are not included in the subset of UEs, thereby reducing paging overhead.

In some other examples, when a UE is in an idle state, such as an RRC_IDLE state, the UE is not actively connected to the network node but remains reachable by the network node for incoming paging signals. The idle state may also be referred to as an idle mode (hereinafter used interchangeably). In some such examples, the network node may transmit paging signals to the idle state UE in accordance with an enhanced paging configuration. Specifically, the network node may provide a list of recommended beams to an access and mobility management function (AMF). The AMF stores the list of recommended beams received from the network node while the UE is in the idle state. During idle state paging, the AMF may send the stored list of recommended beams to the last serving network node, such that the network node may transmit paging signals, to the idle state UE, via specific beams and/or resources associated with the idle state UE. The likelihood of successful paging may increase by using the specific beams and resources associated with the idle state UE.

As discussed, the enhanced paging configuration uses beam-level information to target paging signals to a subset of UEs within a coverage area. This type of targeting requires the network node to continually monitor the location of each UE as the UE moves within the coverage area. Tracking UEs may be particularly challenging when the UEs are in an idle or inactive state. These UEs may be referred to as idle UEs. During these periods, the limited interaction with the network makes it difficult to accurately monitor respective locations of idle UEs.

Various aspects of the present disclosure are directed to tracking idle UEs in accordance with a location update procedure. In such aspects, the idle UEs may be tracked at a cell level and/or a beam level, thereby facilitating the use of an enhanced paging configuration for transmitting paging information to the stationary or limited-mobility UEs. In some examples, a limited mobility zone may be associated with a specific area within a coverage area of one or more cells. The area may be an example of an area where UEs exhibit limited mobility. Additionally, or alternatively, the area may be an example of an area where UEs remain for an extended period of time. Examples of limited mobility zones include, but are not limited to, vehicles with vehicle-mounted radios (VMRs), office buildings, residential areas, and/or shopping centers, among other areas. In such examples, a network node may transmit, to a UE, a first message indicating one or more parameters associated with a limited mobility zone within a coverage area of one or more cells. The one or more parameters include one or more of a first set of synchronization signal blocks (SSBs), beam directions, a reference signal received power (RSRP) threshold, a pathloss threshold, geolocation coordinates, and a set of cell identifiers. The network node may then receive, from the UE, while the UE is in an inactive state or idle state, a second message indicating the UE is within the limited mobility zone in accordance with the UE determining it is within the limited mobility zone. The UE may determine it is in the limited mobility zone in accordance with the one or more parameters. The network node may then transmit, to the UE, a third message including paging information in accordance with a paging configuration associated with the limited mobility zone. In some examples, the paging configuration may be an enhanced paging configuration.

In some other examples, the network node may define a limited mobility zone and a high mobility zone within a coverage area of one or more cells. In such examples, the limited mobility zone is associated with a first set of geolocation coordinates, and the high mobility zone is associated with a second set of geolocation coordinates. Additionally, in such examples, the network node may transmit, to the UE, a first message indicating the limited mobility zone and the high mobility zone within the coverage area. The network node may then determine the UE is within the limited mobility zone in accordance with a mobility of the UE being less than a mobility threshold. In some examples, the network node receives, from the UE, a message indicating the UE's location information, and the network node determines the mobility of the UE is less than the mobility threshold in accordance with the location information. In some other examples, the network node receives, from the UE, a message indicating the mobility of the UE is less than the mobility threshold. After determining the mobility of the UE is less than the mobility threshold, the network node may transmit, to the UE, a second message registering the UE with the limited mobility zone. The network node may then transmit, to the UE, a third message including paging information in accordance with a paging configuration associated with the limited mobility zone. In some examples, the paging configuration may be an enhanced paging configuration.

Particular aspects of the subject matter described in this disclosure can be implemented to realize one or more of the following potential advantages. In some examples, the described techniques, such as defining a limited mobility zone within a coverage area of one or more cells, allows a network node to track an idle UE. By knowing the location of the idle UE, the network node may transmit paging information to the idle or inactive UE in accordance with an enhanced paging configuration. The use of the enhanced paging configuration may reduce network overhead and improve overall network performance.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells.

The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a mobility zone module 140. For brevity, only one UE 120d is shown as including the mobility zone module 140. The mobility zone module 140 may perform one or more operations, such as one or more operations of the process 900 described with reference to FIG. 9 and/or the process 1000 described with reference to FIG. 10.

Figure 3:
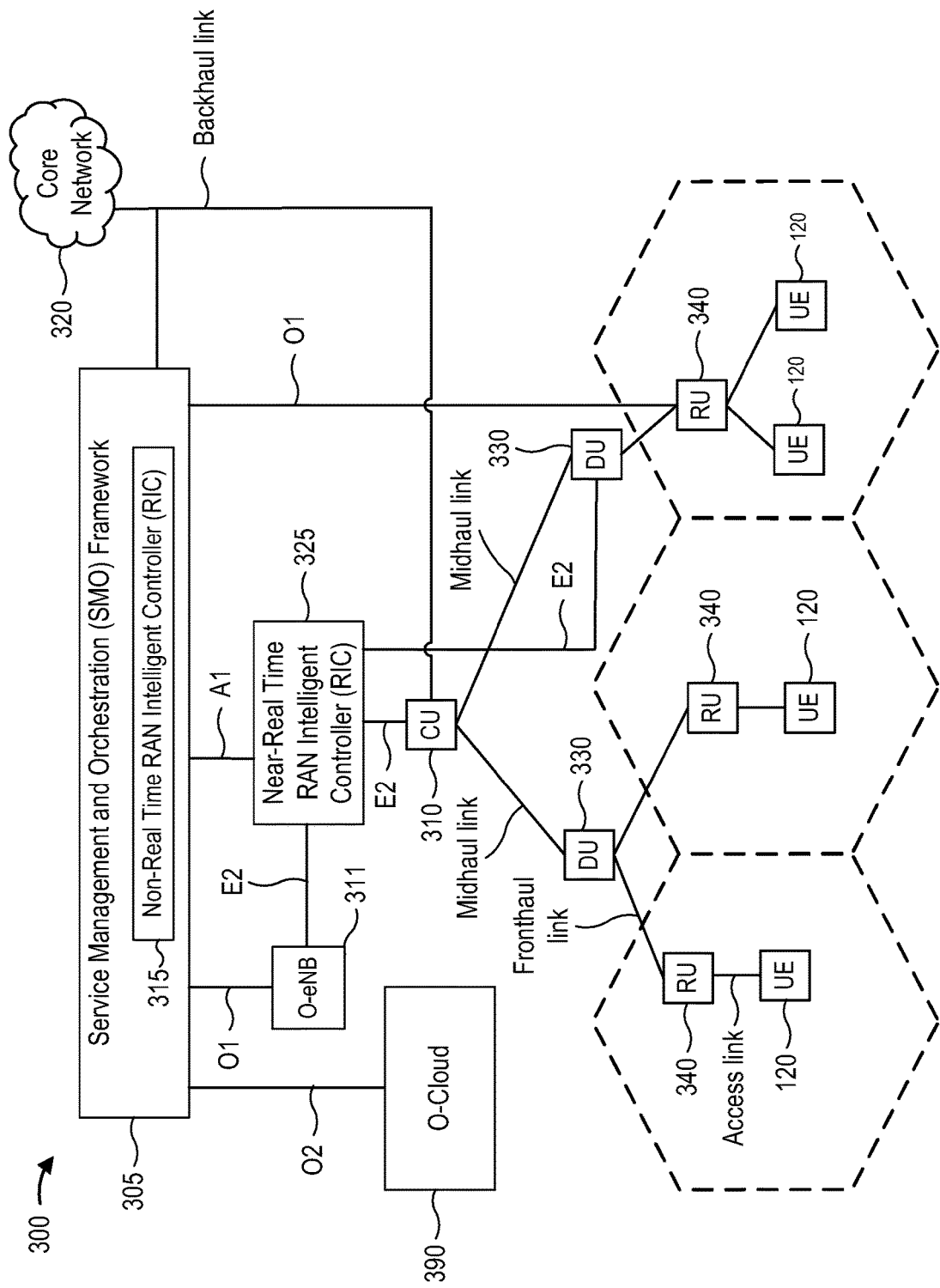
FIG. 3 is a block diagram illustrating an example disaggregated base station architecture, in accordance with various aspects of the present disclosure.

The core network 130 or the base stations 110 or any other network device (for example, as seen in FIG. 3) may include a mobility zone module 138 For brevity, only one base stations 110 is shown as including the mobility zone module 138. The mobility zone module 138 may perform one or more operations, such as one or more operations of the process 900 described with reference to FIG. 9 and/or the process 1000 described with reference to FIG. 10.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
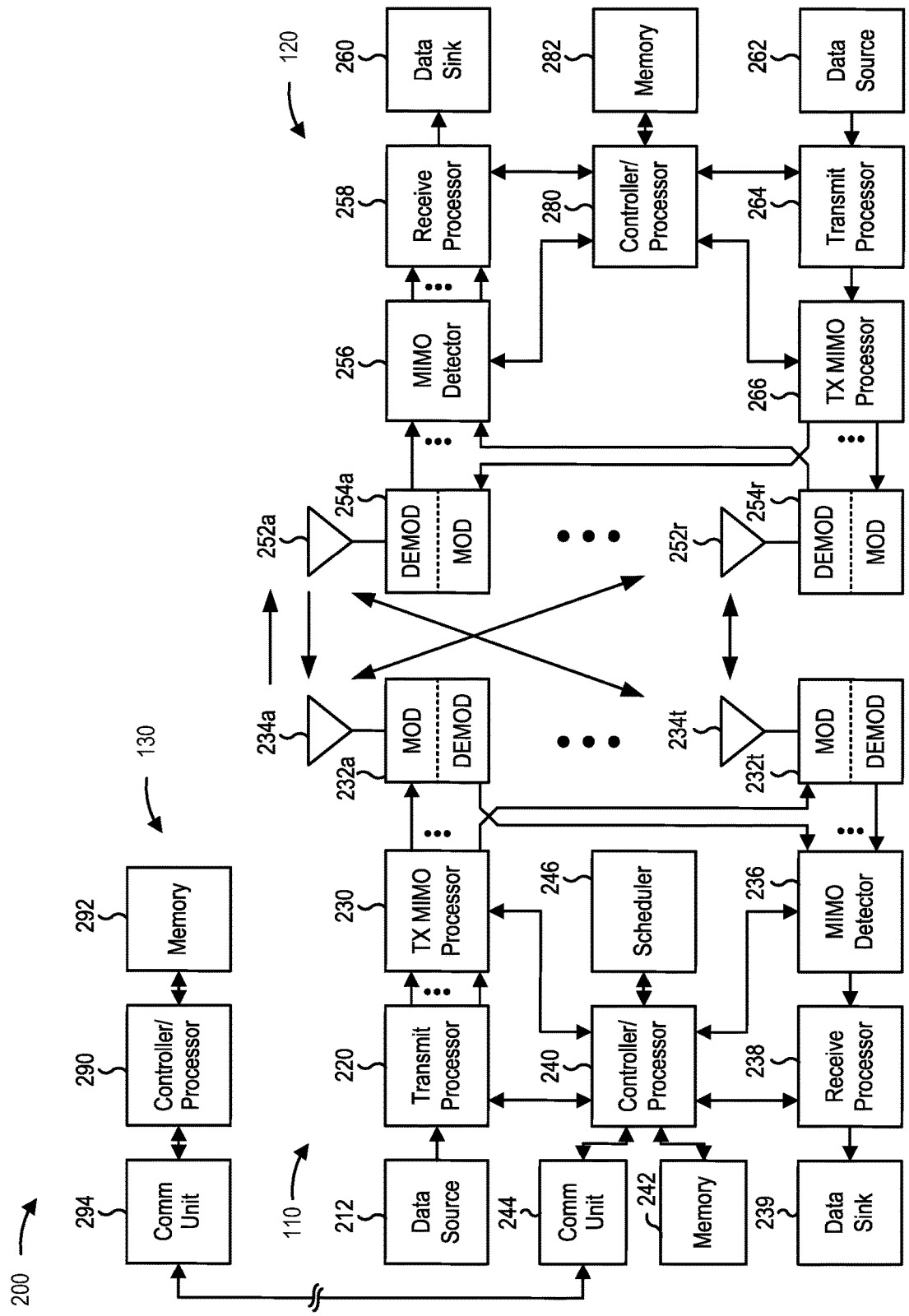
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with transmitting and/or receiving paging information in accordance with a location of a UE 120 as described in more detail elsewhere. For example, the controller/processor 240 of the base station 110, the controller/processor 280 of the UE 120, and/or any other component(s) of FIG. 2 may perform or direct operations of, for example, the processes of FIGS. 9 and 10 and/or other processes as described. Memories 242 and 282 may store data and program codes for the base station 110 and UE 120, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

As discussed, in some cases, a network node may transmit paging signals to one or more user equipment (UEs) within a coverage area in accordance with an enhanced paging configuration. In such cases, the network node may use beam-level information to target a subset of UEs, from a set of UEs, within the coverage area. The subset of UEs may include one or more UEs. Each beam corresponds to a directional signal transmitted by the network, thus localizing the transmission of the paging signals.

In some examples, the network node may initiate a paging procedure to locate one or more specific UEs in accordance with the enhanced paging configuration. This paging procedure may be an example of radio access network (RAN) initiated paging. In such cases, the network node targets the subset of UEs, from the set of UEs, for one or more paging signals from the network node. In some such examples, the network node may use a secondary synchronization signal (SSS) list to target the subset of UEs. This approach reduces unnecessary paging attempts to UEs that are not included in the subset of UEs, thereby reducing paging overhead.

In some other examples, when a UE is in an idle state, such as an RRC_IDLE state, the UE is not actively connected to the network node but remains reachable by the network node for incoming paging signals. In some such examples, the network node may transmit paging signals to the idle state UE in accordance with an enhanced paging configuration. Specifically, the network node may provide a list of recommended beams to an access and mobility management function (AMF). The AMF stores the list of recommended beams received from the network node while the UE is in the idle state. During idle state paging, the AMF may send the stored list of recommended beams to the last serving network node, such that the network node may transmit paging signals to the idle state UE via specific beams and/or resources associated with the idle state UE. The likelihood of successful paging may increase by using the specific beams and resources associated with the idle state UE.

As discussed, the enhanced paging configuration uses beam-level information to target paging signals to a subset of UEs within a coverage area. This type of targeting requires the network node to continually monitor the location of each UE as the UE moves within the coverage area. Tracking UEs may be particularly challenging when the UEs are in an idle or inactive state. During these periods, the limited interaction with the network makes it difficult to accurately monitor respective locations of UEs in the idle state or the inactive state.

In some cases, a location update procedure may be used to monitor movement of a UE. The location update procedure is specified to monitor the activity of a UE. For example, the location update procedure may track the activity of the UE within designated tracking areas associated with one or more tracking area codes (TACs) or broader radio access network (RAN) area codes (RANACs). In some such cases, for an idle state UE, a location registration procedure may be initiated when the UE connects to a cell that is not part of any of the tracking areas to which the UE is registered. Additionally, the idle state UE may support periodic registration updates, in which the idle state UE periodically updates its registration even while idle. The idle state may also be referred to as an idle mode.

In some other cases, when a UE is in an inactive state, such as an RRC-inactive state, the UE's location may be updated in accordance with a RAN notification area (RNA) update procedure. The RNA procedure may periodically occur in accordance with a predefined timer. For example, the timer may be set between five minutes to 12 hours. Alternatively, the RNA procedure may be triggered in response to the UE connecting to a cell that does not belong to a configured RAN notification area. The RNA procedure may ensure that the network node remains aware of the UE's location and maintains accurate tracking, even during inactive periods.

Various aspects of the present disclosure are directed to tracking stationary or limited-mobility UEs in accordance with a location update procedure. In such aspects, the stationary or limited-mobility UEs may be tracked at a cell level and/or a beam level, thereby facilitating the use of an enhanced paging configuration for the stationary or limited-mobility UEs.

In some examples, it may be reasonable to assume that one or more UEs within a zone exhibit limited mobility or remain within the zone for extended periods. This zone may be an example of a limited mobility zone, which may be referred to as a low mobility zone (hereinafter used interchangeably). Examples of limited mobility zones include, but are not limited to, vehicles with vehicle-mounted radios (VMRs), office buildings, residential areas, and/or shopping areas, among other areas. Accordingly, a mobility of a UE may be less than a mobility threshold while the UE is in the limited mobility zone. For example, the UE may be stationary or remain within a limited area in the limited mobility zone. In some cases, a TAC or RANAC may be established within the limited mobility zone, provided the limited mobility zone entirely encompasses a coverage area of one or multiple cells associated with the limited mobility zone. In some cases, a TAC or RANAC may be associated with the limited mobility zone. This may be similar to the concept of a VMR or a mobile integrated access and backhaul (IAB), where a TAC coincides with a mobile IAB cell.

In some cases, a coverage area of a cell may partially overlap with a limited mobility zone. Thus, in some examples, a TAC, RANAC, or RNA may be defined as a limited mobility zone with a granularity level that is beyond a single cell. In such examples, the limited mobility zone may be defined in accordance with one or more parameters, such as (but not limited to) one or more of a first set of SSBs, beam directions, a reference signal received power (RSRP) threshold, a pathloss threshold, geolocation coordinates, or a set of cell identifiers. To enable these granular mobility zones, a signaling mechanism may be specified across a variety of signaling interfaces. These signaling interfaces may include, for example, a cellular interface (for example, a Uu interface) which includes RRC signaling, an F1 interface, an Xn interface, or a next generation-application protocol (NG-AP) interface. The signaling may be transmitted between various network devices, such as UEs, network nodes, DUs, CUs, and/or AMFs. In some wireless systems, such as 6G or beyond, the limited mobility zone may transcend a differentiation between areas, such as TACs, RANACs, or RNAs.

FIG. 4A is a diagram illustrating an example of a limited mobility zone 402, in accordance with various aspects of the present disclosure. In the example of FIG. 4A, the limited mobility zone 402 may be within a first coverage area of a first cell 404 associated with a first network node 110*a*. A high mobility zone 406 may also be defined within the coverage area of the cell 404. Additionally, a second coverage area 408 associated with one or more other cells may be associated with the high mobility zone 406. The one or more other cells may be associated with other network nodes 110*b*. In the example of FIG. 4A, the limited mobility zone 402 may be associated with a first set of SSBs. For example, the UE may determine it is within the limited mobility zone 402 upon receiving the first set of SSBs from the network node 110*a*. As another example, the UE may determine it is within the high mobility zone 406 upon receiving a second set of SSBs from one of the network node 110*a* or 110*b*.

FIG. 4B is a diagram illustrating an example of a limited mobility zone 410, in accordance with various aspects of the present disclosure. In the example of FIG. 4B, the limited mobility zone 410 may be within a first coverage area of a first cell 404 associated with a first network node 110*a*. A high mobility zone 412 may also be defined within the coverage area of the cell 404. Additionally, a second coverage area 408 associated with one or more other cells may be associated with the high mobility zone 412. The one or more other cells may be associated with other network nodes 110b. In the example of FIG. 4B, the limited mobility zone 410 may be associated with a first RSRP threshold or a first pathloss threshold. For example, if a UE determines an RSRP of a signal satisfies an RSRP condition, such as being less than the first RSRP threshold, then the UE may determine it is within the limited mobility zone 410. Alternatively, the RSRP condition may be satisfied if the RSRP is greater than the first RSRP threshold. As another example, if a UE determines a pathloss of a signal satisfies a pathloss condition, such as being less than a first pathloss threshold, then the UE may determine it is within the limited mobility zone 410. Alternatively, the pathloss condition may be satisfied if the pathloss is greater than the pathloss first threshold. The high mobility zone 412 may be associated with a second RSRP threshold or a second pathloss threshold. For example, the UE may determine it is in the high mobility zone 412 if the RSRP satisfies a condition, such as being greater than or less than, the second RSRP threshold.

FIG. 4C is a diagram illustrating an example of a limited mobility zone 420, in accordance with various aspects of the present disclosure. In the example of FIG. 4C, the limited mobility zone 420 may be within a first coverage area of a first cell 422 associated with a first network node 110a and a second cell 424 associated with a second network node 110b. A high mobility zone 426 may also be defined within the coverage area of the first cell 422, second cell 424, and other cells associated with other network nodes 110c. In the example of FIG. 4C, the limited mobility zone 420 may be associated with cell IDs. In some examples, the limited mobility zone 420 may also be associated with an RSRP threshold. For example, the UE may determine it is within the limited mobility zone 420 upon detecting the cell IDs associated with the first cell 422 and the second cell 424. In some other examples, the UE may determine it is within the limited mobility zone 420 upon detecting the aforementioned cell IDs, as well as determining an RSRP satisfies an RSRP condition, such as being greater than or less than the RSRP threshold.

FIG. 4D is a diagram illustrating an example of a limited mobility zone 430, in accordance with various aspects of the present disclosure. In the example of FIG. 4D, the limited mobility zone 430 may be within a coverage area 434 of one or more cells associated with one or more network nodes 110. A high mobility zone 432 may also be defined within the coverage area 434. In the example of FIG. 4D, the limited mobility zone 430 may be associated with geolocation coordinates. For example, the UE may determine it is within the limited mobility zone 430 upon determining its geolocation is within the geolocation coordinates associated with the limited mobility zone 430. In some cases, an inactive UE or an idle UE may periodically determine its current geolocation.

Figure 5:
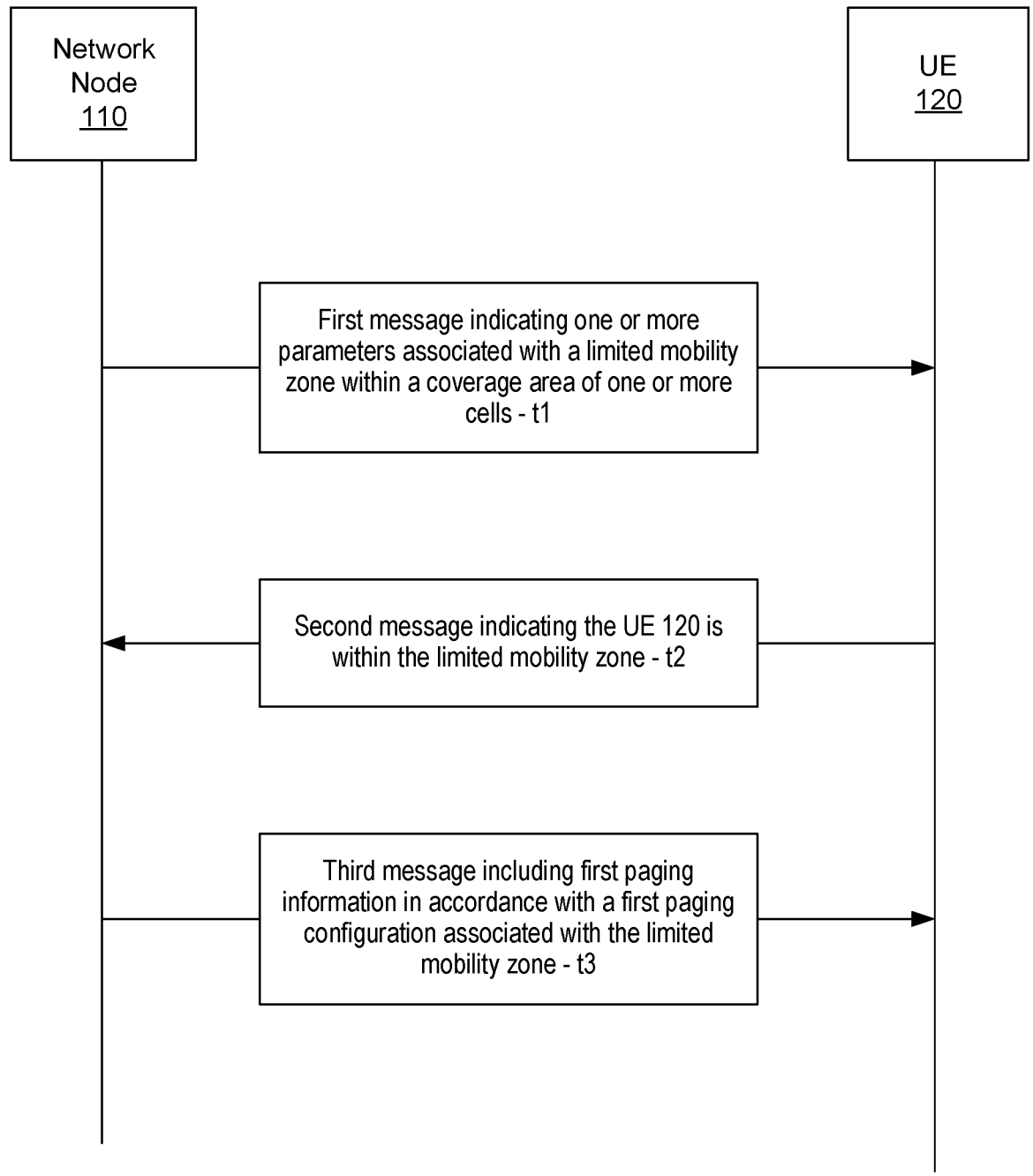
FIG. 5 is a timing diagram illustrating an example of transmitting paging information to a UE, in accordance with various aspects of the present disclosure.

FIG. 5 is a timing diagram 500 illustrating an example of transmitting paging information to a UE 120, in accordance with a location of the UE 120 within a coverage area of one or more cells. In the example of FIG. 5, the UE 120 may be in an idle mode or an inactive state. At time t1, a network node 110 may transmit, to the UE 120, a first message indicating one or more parameters associated with a limited mobility zone within a coverage area of one or more cells. The first message may be transmitted prior to the UE 120 entering the idle mode or inactive state. The one or more parameters include one or more of a first set of SSBs, beam directions, an RSRP threshold, a pathloss threshold, geolocation coordinates, and a set of cell identifiers. The network node 110 may be associated with one cell of the one or more cells. Furthermore, the limited mobility zone may be associated with a RANAC, or an RNA.

As shown in the example of FIG. 5, at time t2, the network node 110 may receive, from the UE 120, a second message indicating the UE 120 is within the limited mobility zone in accordance with the UE 120 determining it is within the limited mobility zone in accordance with the one or more parameters. In some examples, the second message may be included in a registration message associated with a location registration procedure or an RNA update procedure. At time t3, the network node 110 may transmit, to the UE 120, a third message including first paging information in accordance with a first paging configuration associated with the limited mobility zone.

In some examples, after or prior to determining the UE 120 is within the limited mobility zone, the UE 120 may determine it is within the coverage area and outside the limited mobility zone. For example, the UE 120 may determine it is within a high mobility zone, such as one of the high mobility zones 406, 412, 426, or 432 described with reference to FIGS. 4A, 4B, 4C, and 4D, respectively, in accordance with one or more parameters associated with the high mobility zone. Alternatively, the UE 120 may determine it is not in the limited mobility zone based on the one or more parameters associated with the limited mobility zone. For example, the UE 120 may determine it is within another zone, such as a high mobility zone. In such examples, the network node 110 may receive, from the UE 120, a fourth message indicating the UE 120 is not within the limited mobility zone in accordance with determining the UE 120 is within the coverage area and outside the limited mobility zone. The network node 110 may then transmit, to the UE 120, a fifth message including second paging information in accordance with a second paging configuration associated with the UE 120 being within the coverage area and outside the limited mobility zone. In some examples, the first paging configuration may be an enhanced paging configuration, and the second configuration may be a restricted paging configuration. Additionally, or alternatively, the first paging configuration may use a first set of beams and first resources, while the second paging configuration may use a second set of beams and second resources. One or more beams of the first set of beams may be the same as one or more beams of the second set of beams.

In some cases, a limited mobility zone may not be distinctly distinguished from a high mobility zone. Rather, UEs with varying mobility characteristics may be located in a given area. For UEs in an inactive state, the RNA may be configured in a UE-specific manner and may include a single cell. For UEs in an idle state, two or more TACs may be defined within a coverage area of one or more cells, such that different UEs may use different TACs for their respective location updates. In some cases, two or more TACs may be defined for non-terrestrial networks (NTNs) using a tracking area list. Various aspects of the present disclosure expand this functionality beyond NTNs. In some examples, a UE may indicate its capability to support two or more TACs in a coverage area.

Figure 6:
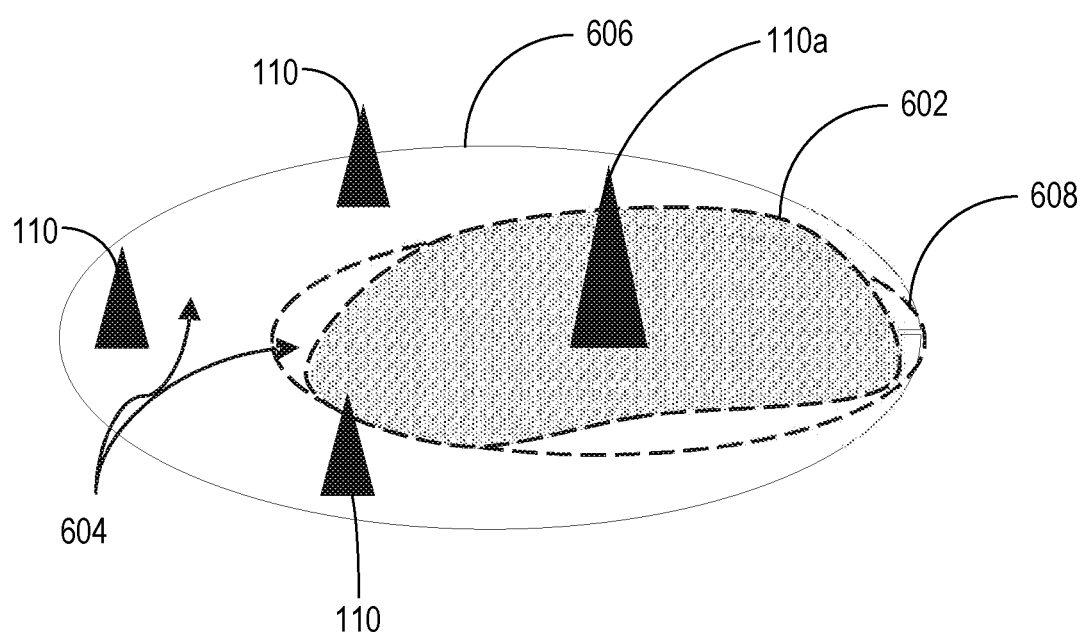
FIG. 6 is a diagram illustrating an example of multiple tracking areas within a coverage area, in accordance with various aspects of the present disclosure.

FIG. 6 is a diagram illustrating an example of multiple TACs within a coverage area, in accordance with various aspects of the present disclosure. As shown in the example of FIG. 6, a first TAC 602 and a second TAC 604 may be defined within a coverage area 606 of one or more cells associated with one or more network nodes 110. For example, a first network node 110*a* may be associated with a first cell 608. The first TAC 602 may be a limited mobility zone, and the second TAC 604 may be a high mobility zone.

In some examples, the first network node 110*a* may advertise the first TAC 602 and the second TAC 604. In some such examples, the first network node 110*a* may determine a UE (not shown in FIG. 6) connected to the first cell 608 has limited mobility or is stationary. In accordance with determining the UE has limited mobility or the UE is stationary, the first network node 110*a* may configure the UE with a registration area including the first TAC 602. In such examples, as long as the UE detects the first cell 608 or other cells that advertise the first TAC 602, the UE will not update its location.

In some examples, a UE may be mobile while connected to the first cell 608, and the UE may then become immobile (for example, stationary or limited mobility) when entering an idle state or inactive state. In such examples, the first network node 110*a* may determine the UE has become immobile based on a period location update. Alternatively, the UE may expressly indicate, to the first network node 110*a*, that the UE has become immobile. This indication may be transmitted after reestablishing or resuming its connection with the first network node 110*a*. In such examples, in accordance with determining the UE has limited mobility or is stationary, the first network node 110*a* may configure the UE with a registration area including the first TAC 602.

As discussed, different zones, such as a limited mobility zone and/or a high mobility zone, may be established and subsequently linked to stationary or limited-mobility UEs. Each zone may be associated with a geolocation and/or other parameters, such as cell ID, beam direction, SSB set, or RSRP threshold. Additionally, the TAC or RAN area may be associated with each zone. In some examples, if an idle or inactive UE possesses the ability to determine its geographical location and recognizes entry or exit from a designated zone, the idle or inactive UE may then initiate a location update.

In some examples, while a UE is in a connected mode, the UE may enter a limited mobility zone and autonomously establish its location within the zone. In some such examples, the connected UE may transmit, to a network node, such as a base station or core network node (for example, AMF), a message indicating the UE has entered the zone. In some such examples, the UE may receive, from a network node, a message configuring the zone for the UE. Additionally, the message indicating the UE's location within the zone may be transmitted in accordance with the UE transitioning to an idle or inactive state.

In some other examples, a UE in a connected state may enter a designated zone, such as a limited mobility zone, and a network node determines the UE's presence within the zone. In conventional systems, a base station may report, to the AMF, an area of interest via a location reporting procedure. The area of interest may include a cell, TAC, or an operation, administration, and maintenance (OAM)-defined area. However, in conventional systems, the area of interest does not include a location defined by geolocation coordinates. In some examples, if geolocation information of the UE confirms the presence of the UE in the area of interest, the network node may acquire the UE's location via a location management function (LMF). Specifically, the network node may determine the UE's location via the UE's generic public subscription identifier (GPSI) for this purpose. In some examples, the AMF conveys the GPSI of a UE to the base station. Additionally, or alternatively, in some examples, a network node, such as an LMF or AMF, may actively monitor the UE's location and subsequently indicate to another network node, such as a base station or AMF, the UE's location. This inter-network communication ensures that network nodes remain informed of the UE's movements and location.

Figure 7:
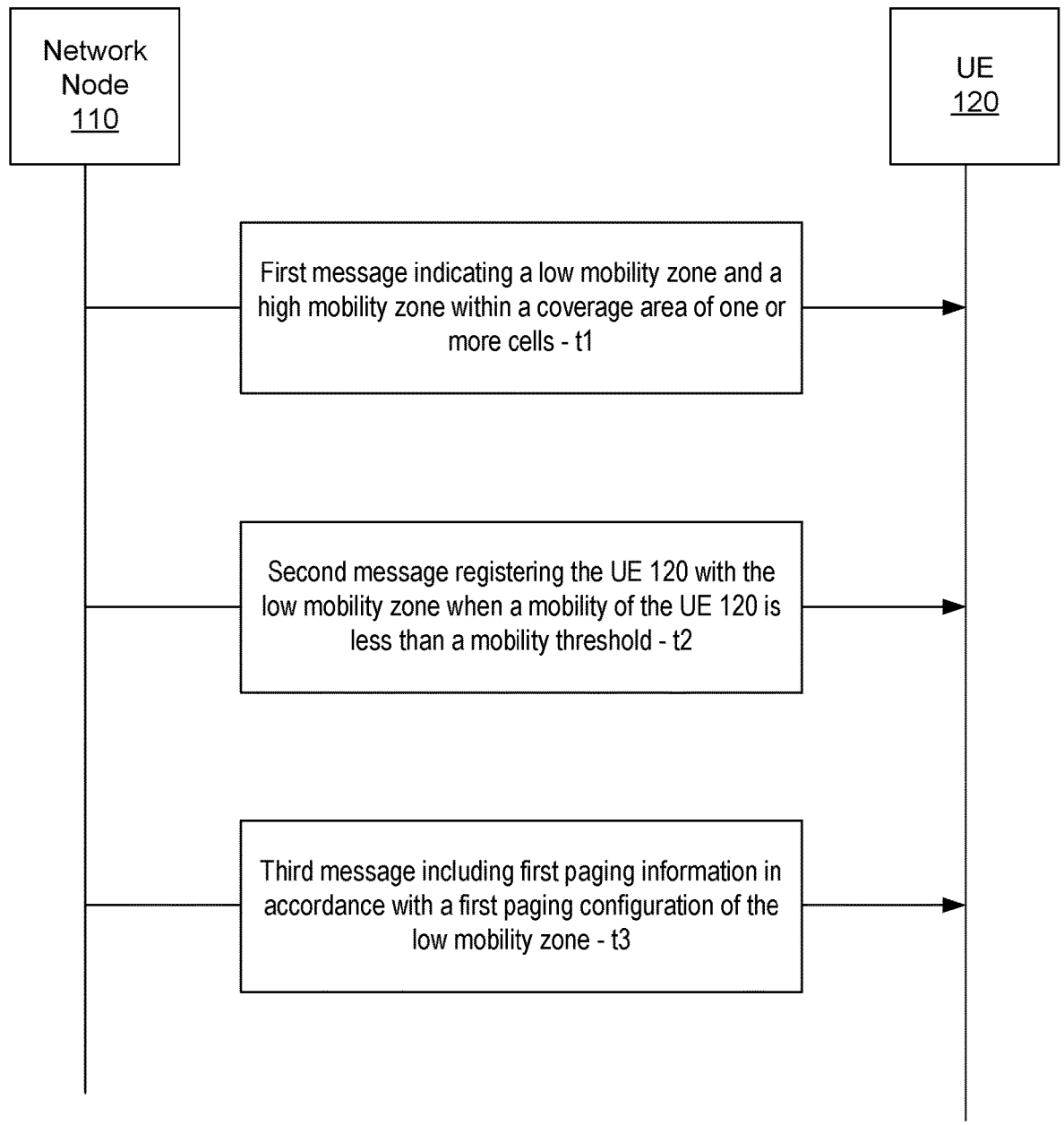
FIG. 7 is a timing diagram illustrating an example of transmitting paging information to a UE, in accordance with various aspects of the present disclosure.

FIG. 7 is a timing diagram 700 illustrating an example of transmitting paging information, to a UE 120, in accordance with various aspects of the present disclosure. In the example of FIG. 7, the UE 120 may be in an idle mode or an inactive state. At time t1, a network node 110 may transmit, to the UE 120, a first message indicating a limited mobility zone and a high mobility zone within a coverage area of one or more cells. The first message may be transmitted prior to the UE 120 entering the idle mode or inactive state. In some examples, at least a portion of the limited mobility zone overlaps at least a portion of the high mobility zone. Additionally, in some examples, the limited mobility zone and the high mobility zone may be defined by respective geolocation coordinates. In some examples, the network node 110 may receive, from the UE 120, a message indicating support for multiple mobility zones within the coverage area.

At time t2, the network node 110 transmits, to the UE 120, a second message registering the UE 120 with the limited mobility zone when a mobility of the UE 120 is less than a mobility threshold. The mobility of the UE 120 may be less than the mobility threshold when the UE 120 is stationary or has limited mobility. In some examples, the network node 110 may receive from the UE 120, a message indicating location information associated with the UE 120. The network node 110 may determine the mobility of the UE 120 is less than the mobility threshold in accordance with the location information. The UE 120 may periodically transmit the message indicating the location information. In some other example, the network node 110 may receive a message, from the UE 120, indicating the mobility of the UE 120 is less than the mobility threshold.

As shown in FIG. 7, at time t3, the network node 110 may transmit, to the UE 120, a third message including first paging information in accordance with a first paging configuration of the limited mobility zone. In some examples, prior to or after time t3, the network node 110 may transmit, to the UE 120, a message registering the UE 120 with the high mobility zone when the mobility of the UE 120 is equal to or greater than the mobility threshold. In such examples, the network node 110 may also transmit, to the UE 120, second paging information of a second paging configuration associated with the high mobility zone. In some examples, the first paging configuration is an enhanced paging configuration, and the second paging configuration is a restricted paging configuration. Additionally, or alternatively, the first paging configuration may use a first set of beams and first resources, while the second paging configuration may use a second set of beams and second resources. One or more beams of the first set of beams may be the same as one or more beams of the second set of beams.

In some examples, the UE 120 may determine, while in a connected mode, that the UE 120 is located within the limited mobility zone. In some such examples, the network node 110 may receive, from the UE 120, a message indicating the UE 120 is located within the limited mobility zone. The message may be transmitted when the UE 120 enters an idle mode or an inactive state.

In some other examples, the UE 120 may be located within the limited mobility zone while the UE 120 is in a connected mode. In some such examples, the network node 110 determines the UE 120 is located within the limited mobility zone in accordance with a GPSI associated with the UE 120. The network node 110 may receive the GPSI from a core network, such as an AMF. In other examples, the network node 110 determines the UE 120 is located within the limited mobility zone in accordance with a core network tracking a geolocation of the UE 120. The core network may then indicate the geolocation of the UE 120 to the network node 110.

Figure 8:
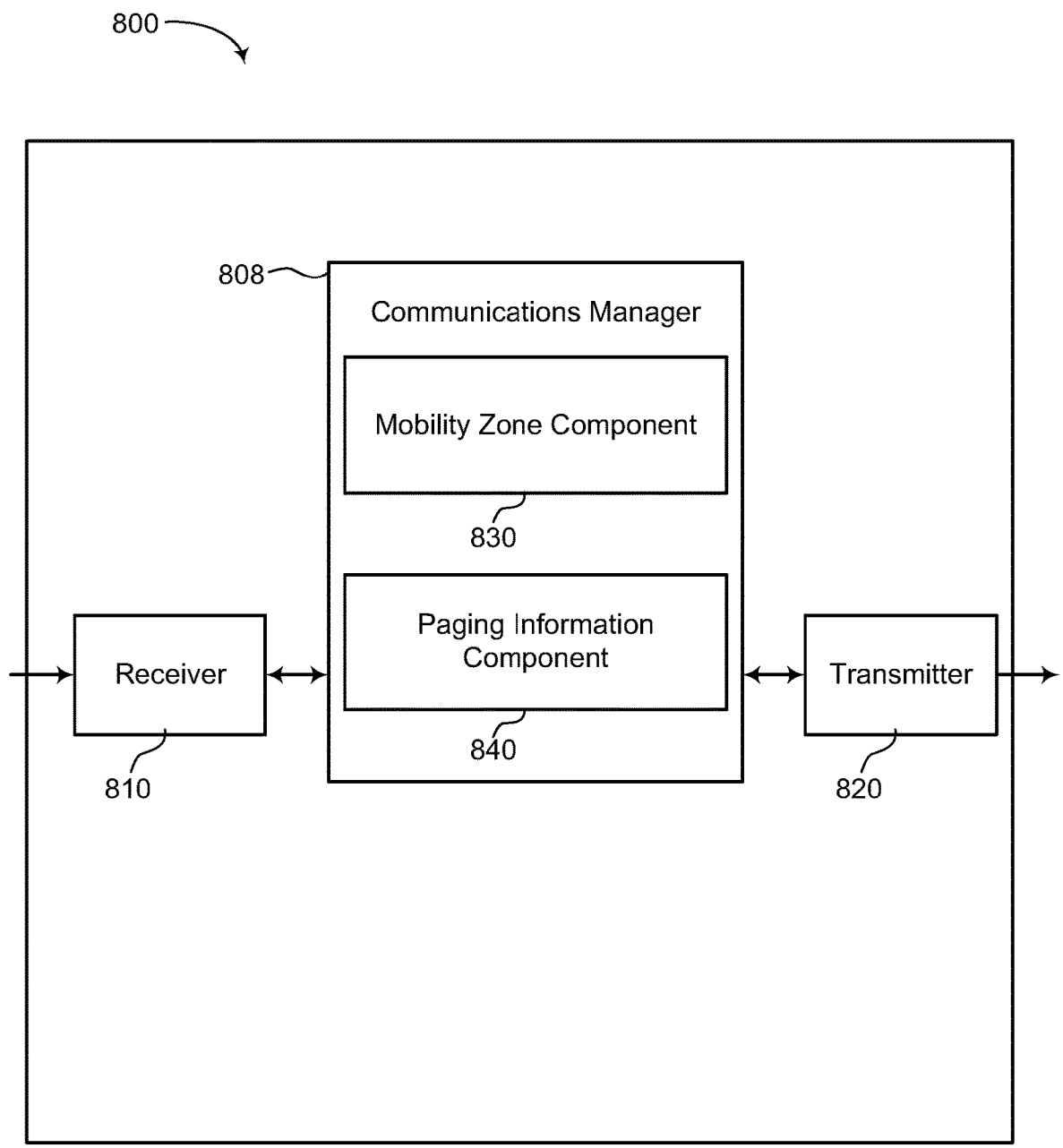
FIG. 8 is a block diagram illustrating an example wireless communication device that supports receiving paging information in accordance with a paging configuration associated with a limited mobility zone, in accordance with various aspects of the present disclosure.

FIG. 8 is a block diagram illustrating an example wireless communication device 800 that supports receiving paging information in accordance with a paging configuration associated with a limited mobility zone, in accordance with aspects of the present disclosure. The device 800 may be an example of aspects of a UE 120 described with reference to FIGS. 1, 2, 3, 5, and 7. The wireless communication device 800 may include a receiver 810, a communications manager 808, a transmitter 820, a mobility zone component 830, and a paging information component 840, which may be in communication with one another (for example, via one or more buses). In some examples, the wireless communication device 800 is configured to perform operations, including operations of the processes 900 and 1000 described below with reference to FIGS. 9 and 10, respectively.

In some examples, the wireless communication device 800 can include a chip, chipset, package, or device that includes at least one processor and at least one modem (for example, a 5G modem, a 6G modem, or other cellular modem). In some examples, the communications manager 808, or its sub-components, may be separate and distinct components. In some examples, at least some components of the communications manager 808 are implemented at least in part as software stored in a memory. For example, portions of one or more of the components of the communications manager 808 can be implemented as non-transitory code executable by the processor to perform the functions or operations of the respective component.

The receiver 810 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical shared control channel (PSCCH)) and data channels (for example, a physical downlink shared channel (PDSCH), physical sidelink shared channel (PSSCH), a physical uplink shared channel (PUSCH)). The other wireless communication devices may include, but are not limited to, a base station 110 described with reference to FIGS. 1, 2, and 4, a DU 330, an RU 340, or a CU 310 described with reference to FIG. 3.

The received information may be passed on to other components of the device 800. The receiver 810 may be an example of aspects of the receive processor 288 described with reference to FIG. 2. The receiver 810 may include a set of radio frequency (RF) chains that are coupled with or otherwise utilize a set of antennas (for example, the set of antennas may be an example of aspects of the antennas 252 described with reference to FIG. 2).

The transmitter 820 may transmit signals generated by the communications manager 808 or other components of the wireless communication device 800. In some examples, the transmitter 820 may be collocated with the receiver 810 in a transceiver. The transmitter 820 may be an example of aspects of the transmit processor 264 described with reference to FIG. 2. The transmitter 820 may be coupled with or otherwise utilize a set of antennas (for example, the set of antennas may be an example of aspects of the antennas 252 described with reference to FIG. 2), which may be antenna elements shared with the receiver 810. In some examples, the transmitter 820 is configured to transmit control information in a PUCCH, PSCCH, or PDCCH and data in a physical uplink shared channel (PUSCH), PSSCH, or PDSCH.

The communications manager 808 may be an example of aspects of the controller/processor 280 described with reference to FIG. 2. The communications manager 808 may include the mobility zone component 830 and the paging information component 840. In some examples, working in conjunction with the receiver 810, the mobility zone component 830 may receive, from a network node, a first message indicating one or more parameters associated with a limited mobility zone within a coverage area of one or more cells. Additionally, working in conjunction with the transmitter 820, the mobility zone component 830 may transmit, to the network node, a second message indicating the UE is within the limited mobility zone in accordance with determining the UE is within the limited mobility zone in accordance with the one or more parameters. Working in conjunction with the receiver 810, the paging information component 840 may receive, from the network node, a third message including first paging information in accordance with a first paging configuration associated with the limited mobility zone.

In other examples, working in conjunction with the receiver 810, the mobility zone component 830 may receive, from a network node, a first message indicating a limited mobility zone and a high mobility zone within a coverage area of one or more cells. Furthermore, working in conjunction with the receiver 810, the mobility zone component 830 may receive, from the network node, a second message registering the UE with the limited mobility zone in accordance with a mobility of the UE being less than a mobility threshold. Finally, working in conjunction with the receiver 810, paging information component 840 may receive, from the network node, a third message including first paging information in accordance with a first paging configuration associated with the limited mobility zone.

Figure 9:
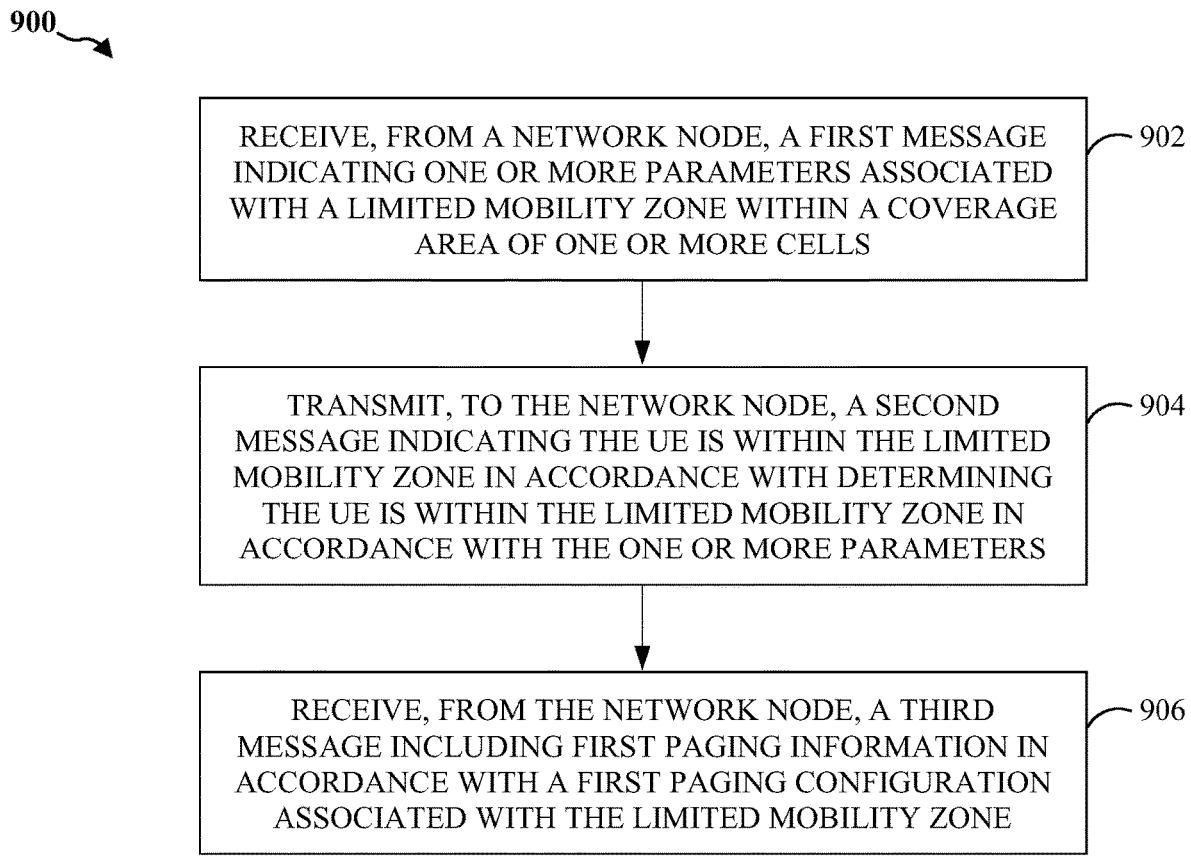
FIGS. 9 and 10 are flow diagrams illustrating examples of processes for receiving paging information in accordance with a paging configuration associated with a limited mobility zone, in accordance with various aspects of the present disclosure.

FIG. 9 is a flow diagram illustrating examples of a process for receiving paging information in accordance with a paging configuration associated with a limited mobility zone, in accordance with various aspects of the present disclosure. The process 900 may be performed by a UE, such as a UE 120 described with reference to FIGS. 1, 2, 3, 5, and 7. As shown in the example of FIG. 9, the process 900 begins at block 902 by receiving, from a network node, a first message indicating one or more parameters associated with a limited mobility zone within a coverage area of one or more cells. At block 904, the process 900 transmits, to the network node, a second message indicating the UE is within the limited mobility zone in accordance with determining the UE is within the limited mobility zone in accordance with the one or more parameters. At block 906, the process 900 receives, from the network node, a third message including first paging information in accordance with a first paging configuration associated with the limited mobility zone.

Figure 10:
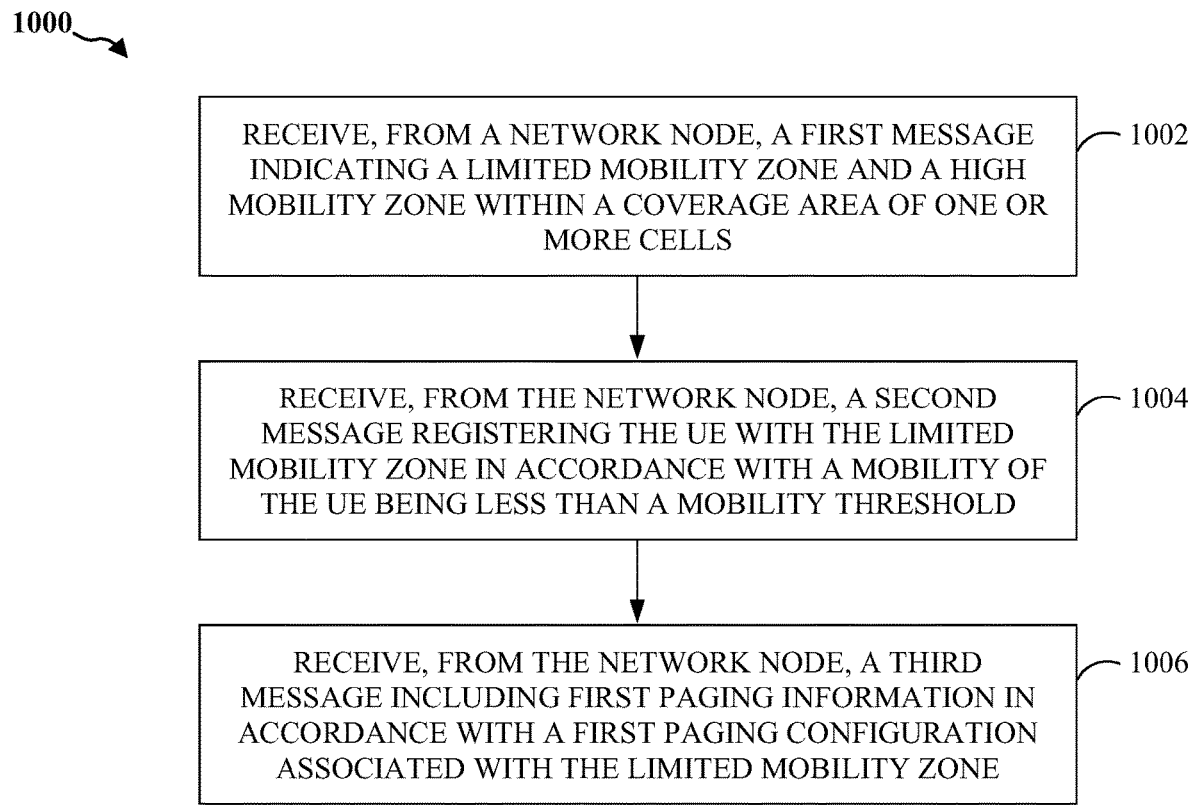

FIG. 10 is a flow diagram illustrating examples of a process for receiving paging information in accordance with a paging configuration associated with a limited mobility zone, in accordance with various aspects of the present disclosure. The process 1000 may be performed by a UE, such as a UE 120 described with reference to FIGS. 1, 2, 3, 5, and 7. As shown in the example of FIG. 10, the process begins at block 1002 by receiving, from a network node, a first message indicating a limited mobility zone and a high mobility zone within a coverage area of one or more cells. At block 1004, the process 1000 receives, from the network node, a second message registering the UE with the limited mobility zone in accordance with a mobility of the UE being less than a mobility threshold. At block 1006, the process 1000 receives, from the network node, a third message including first paging information in accordance with a first paging configuration associated with the limited mobility zone.

Implementation examples are described in the following numbered clauses:

Clause 1. A method for wireless communication by a UE, comprising: receiving, from a network node, a first message indicating one or more parameters associated with a limited mobility zone within a coverage area of one or more cells; transmitting, to the network node, a second message indicating the UE is within the limited mobility zone in accordance with determining the UE is within the limited mobility zone in accordance with the one or more parameters; and receiving, from the network node, a third message including first paging information in accordance with a first paging configuration associated with the limited mobility zone.

Clause 2. The method of Clause 1, wherein the one or more parameters include one or more of a first set of SSB, beam directions, a RSRP threshold, a pathloss threshold, geolocation coordinates, a set of cell identifiers.

Clause 3. The method of any one of Clauses 1-2, further comprising transmitting, to the network node, a registration message associated with a location registration procedure or an RNA update procedure, wherein the second message is included in the registration message.

Clause 4. The method of Clause 3, wherein the UE is in an idle mode or an inactive state.

Clause 5. The method of any one of Clauses 1-4, wherein a mobility of the UE is less than a mobility threshold while in the limited mobility zone.

Clause 6. The method of any one of Clauses 1-5, wherein the limited mobility zone is associated with a TAC, a RANAC, or an RNA.

Clause 7. The method of any one of Clauses 1-6, further comprising: determining the UE is within the coverage area and outside the limited mobility zone in accordance with the one or more parameters; transmitting, to the network node, a fourth message indicating the UE is not within the limited mobility zone in accordance with determining the UE is within the coverage area and outside the limited mobility zone; and receiving, from the network node, a fifth message including second paging information in accordance with a second paging configuration associated with the UE being within the coverage area and outside the limited mobility zone.

Clause 8. The method of Clause 7, wherein the first paging configuration is an enhanced paging configuration and the second paging configuration is a restricted paging configuration.

Clause 9. A method for wireless communication by a UE, comprising: receiving, from a network node, a first message indicating a limited mobility zone and a high mobility zone within a coverage area of one or more cells; receiving, from the network node, a second message registering the UE with the limited mobility zone in accordance with a mobility of the UE being less than a mobility threshold; and receiving, from the network node, a third message including first paging information in accordance with a first paging configuration associated with the limited mobility zone.

Clause 10. The method of Clause 9, further comprising transmitting, to the network node, a fourth message indicating location information associated with the UE, wherein the network node determines the mobility of the UE is less than the mobility threshold in accordance with the location information.

Clause 11. The method of Clause 10, wherein the fourth message is periodically transmitted.

Clause 12. The method of Clause 9, further comprising, transmitting, to the network node, a fourth message indicating the mobility of the UE is less than the mobility threshold.

Clause 13. The method of any one of Clauses 9-12, wherein the UE is in an idle mode or an inactive state.

Clause 14. The method of any one of Clauses 9-13, wherein at least a portion of the limited mobility zone overlaps at least a portion of the high mobility zone.

Clause 15. The method of any one of Clauses 9-14, further comprising: receiving, from the network node, a fourth message registering the UE with the high mobility zone in accordance with the mobility of the UE being equal to or greater than the mobility threshold; and receiving, from the network node, a fifth message including second paging information in accordance with a second paging configuration associated with the high mobility zone.

Clause 16. The method of Clause 15, wherein the first paging configuration is an enhanced paging configuration and the second paging configuration is a restricted paging configuration.

Clause 17. The method of any one of Clauses 9-16, further comprising transmitting, to the network node, a fourth message indicating support for multiple mobility zones within the coverage area.

Clause 18. The method of any one of Clauses 9-17, wherein the limited mobility zone is associated with a first set of geolocation coordinates and the high mobility zone is associated with a second set of geolocation coordinates.

Clause 19. The method of any one of Clauses 9-18, further comprising: determining, while in a connected mode, the UE is located within the limited mobility zone; and transmitting, to the network node, a fourth message indicating the UE is located within the limited mobility zone.

Clause 20. The method of Clause 19, wherein the UE transmits the fourth message in accordance with the UE entering an idle mode or an inactive state.

Clause 21. The method of any one of Clauses 9-20, wherein the UE is located within the limited mobility zone while the UE is in a connected mode.

Clause 22. The method of any one of Clause 9-21, wherein: the network node determines the UE is located within the limited mobility zone in accordance with a GPSI associated with the UE; and the network node receives the GPSI from a core network.

Clause 23. The method of any one of Clause 9-21, wherein the network node determines the UE is located within the limited mobility zone in accordance with a core network tracking a geolocation of the UE.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a user equipment (UE), comprising:
    receiving, from a network node, a first message indicating one or more parameters associated with a limited mobility zone within a coverage area of one or more cells;
    transmitting, to the network node, a second message indicating the UE is within the limited mobility zone in accordance with determining the UE is within the limited mobility zone in accordance with the one or more parameters; and
    receiving, from the network node, a third message including first paging information in accordance with a first paging configuration associated with the limited mobility zone.

2. The method of claim 1, wherein the one or more parameters include one or more of a first set of synchronization signal blocks (SSBs), beam directions, a reference signal received power (RSRP) threshold, a pathloss threshold, geolocation coordinates, a set of cell identifiers.

3. The method of claim 1, further comprising transmitting, to the network node, a registration message associated with a location registration procedure or a radio access network (RAN) notification area (RNA) update procedure, wherein the second message is included in the registration message.

4. The method of claim 3, wherein the UE is in an idle mode or an inactive state.

5. The method of claim 1, wherein a mobility of the UE is less than a mobility threshold while in the limited mobility zone.

6. The method of claim 1, wherein the limited mobility zone is associated with a tracking area code (TAC), a radio access network (RAN) area code (RANAC), or a RAN notification area (RNA).

7. The method of claim 1, further comprising:
    determining the UE is within the coverage area and outside the limited mobility zone in accordance with the one or more parameters;
    transmitting, to the network node, a fourth message indicating the UE is not within the limited mobility zone in accordance with determining the UE is within the coverage area and outside the limited mobility zone; and
    receiving, from the network node, a fifth message including second paging information in accordance with a second paging configuration associated with the UE being within the coverage area and outside the limited mobility zone.

8. The method of claim 7, wherein the first paging configuration is an enhanced paging configuration and the second paging configuration is a restricted paging configuration.

9. A user equipment (UE), comprising:
    one or more processors; and
    one or more memories coupled with the one or more processors and storing processor-executable code that, when executed by the one or more processors, is configured to cause the UE to:
        receive, from a network node, a first message indicating one or more parameters associated with a limited mobility zone within a coverage area of one or more cells;
        transmit, to the network node, a second message indicating the UE is within the limited mobility zone in accordance with determining the UE is within the limited mobility zone in accordance with the one or more parameters; and
        receive, from the network node, a third message including first paging information in accordance with a first paging configuration associated with the limited mobility zone.

10. The UE of claim 9, wherein the one or more parameters include one or more of a first set of synchronization signal blocks (SSBs), beam directions, a reference signal received power (RSRP) threshold, a pathloss threshold, geolocation coordinates, a set of cell identifiers.

11. The UE of claim 9, execution of the processor-executable code further cause the UE to transmit, to the network node, a registration message associated with a location registration procedure or a radio access network (RAN) notification area (RNA) update procedure, wherein the second message is included in the registration message.

12. The UE of claim 11, wherein the UE is in an idle mode or an inactive state.

13. The UE of claim 9, wherein the limited mobility zone is associated with a tracking area code (TAC), a radio access network (RAN) area code (RANAC), or a RAN notification area (RNA).

14. The UE of claim 13, wherein the first paging configuration is an enhanced paging configuration and the second paging configuration is a restricted paging configuration.

15. A method for wireless communication by a user equipment (UE), comprising:
   receiving, from a network node, a first message indicating a limited mobility zone and a high mobility zone within a coverage area of one or more cells;
   receiving, from the network node, a second message registering the UE with the limited mobility zone in accordance with a mobility of the UE being less than a mobility threshold; and
   receiving, from the network node, a third message including first paging information in accordance with a first paging configuration associated with the limited mobility zone.

16. The method of claim 15, further comprising transmitting, to the network node, a fourth message indicating location information associated with the UE, wherein the network node determines the mobility of the UE is less than the mobility threshold in accordance with the location information.

17. The method of claim 16, wherein the fourth message is periodically transmitted.

18. The method of claim 15, further comprising, transmitting, to the network node, a fourth message indicating the mobility of the UE is less than the mobility threshold.

19. The method of claim 15, wherein the UE is in an idle mode or an inactive state.

20. The method of claim 15, wherein at least a portion of the limited mobility zone overlaps at least a portion of the high mobility zone.

21. The method of claim 15, further comprising:
   receiving, from the network node, a fourth message registering the UE with the high mobility zone in accordance with the mobility of the UE being equal to or greater than the mobility threshold; and
   receiving, from the network node, a fifth message including second paging information in accordance with a second paging configuration associated with the high mobility zone.

22. The method of claim 21, wherein the first paging configuration is an enhanced paging configuration and the second paging configuration is a restricted paging configuration.

23. The method of claim 15, further comprising transmitting, to the network node, a fourth message indicating support for multiple mobility zones within the coverage area.

24. The method of claim 15, wherein the limited mobility zone is associated with a first set of geolocation coordinates and the high mobility zone is associated with a second set of geolocation coordinates.

25. The method of claim 15, further comprising:
   determining, while in a connected mode, the UE is located within the limited mobility zone; and
   transmitting, to the network node, a fourth message indicating the UE is located within the limited mobility zone.

26. The method of claim 25, wherein the UE transmits the fourth message in accordance with the UE entering an idle mode or an inactive state.

27. The method of claim 15, wherein the UE is located within the limited mobility zone while the UE is in a connected mode.

28. The method of claim 27, wherein:
   the network node determines the UE is located within the limited mobility zone in accordance with a generic public subscription identifier (GPSI) associated with the UE; and
   the network node receives the GPSI from a core network.

29. The method of claim 27, wherein the network node determines the UE is located within the limited mobility zone in accordance with a core network tracking a geolocation of the UE.

30. A user equipment (UE), comprising:
   one or more processors; and
   one or more memories coupled with the one or more processors and storing processor-executable code that, when executed by the one or more processors, is configured to cause the UE to:
      receive, from a network node, a first message indicating a limited mobility zone and a high mobility zone within a coverage area of one or more cells;
      receive, from the network node, a second message registering the UE with the limited mobility zone in accordance with a mobility of the UE being less than a mobility threshold; and
      receive, from the network node, a third message including first paging information in accordance with a first paging configuration associated with the limited mobility zone.

* * * * *